US005253070A

United States Patent [19]

Hong

[11] Patent Number: 5,253,070

[45] Date of Patent: Oct. 12, 1993

[54] SYSTEM AND METHOD FOR AUTOMATICALLY DETECTING A VARIATION OF VIDEO INFORMATION

[75] Inventor: Sam P. Hong, Kyungsangbook, Rep. of Korea

[73] Assignee: Goldstar Co., Ltd., Rep. of Korea

[21] Appl. No.: 812,429

[22] Filed: Dec. 23, 1991

[30] Foreign Application Priority Data

Dec. 31, 1990 [KR] Rep. of Korea ............... 23063/1990

[51] Int. Cl.[5] ............................................ H04N 5/30

[52] U.S. Cl. .................................. 358/209; 358/108; 358/105

[58] Field of Search ............... 358/209, 210, 105, 107, 358/108, 93

[56] References Cited

U.S. PATENT DOCUMENTS

| | | | |
|---|---|---|---|
| 4,081,830 | 3/1978 | Mick | 358/105 |
| 4,198,653 | 4/1980 | Kamin | 358/105 |
| 4,458,266 | 7/1984 | Mahoney | 358/105 |
| 4,661,853 | 4/1987 | Roeder et al. | 358/167 |
| 4,894,716 | 1/1990 | Aschwanden et al. | 358/105 |
| 5,091,780 | 2/1992 | Pomerleau | 358/108 |

FOREIGN PATENT DOCUMENTS

| | | |
|---|---|---|
| 61-30193 | 2/1986 | Japan . |
| 3-55669 | 3/1991 | Japan . |

*Primary Examiner*—Michael T. Razavi
*Assistant Examiner*—Tuan V. Ho
*Attorney, Agent, or Firm*—Ostrolenk, Faber, Gerb & Soffen

[57] ABSTRACT

A system for automatically detecting a variation of video information, comprising a video information variation detecting circuit for converting a video signal outputted from a monitoring camera into digital data, storing the digital data, or video data by one frame and comparing the current inputted video data with the stored video data to detect a portion different from each other as the variation of video information, a microcomputer for controlling the system operation, and a video output control circuit for setting a window area on the screen and, if the video information variation detecting circuit detects the variation of video information in the set window area, outputting an alarm control signal and generating a variation indicating marker signal corresponding to the variation detected portion in the set window area, such that the marker signal is overlap-displayed on the current picture on the screen corresponding to the variation detected portion in the window area. Also, according to the present invention, there is provided a method of automatically detecting the variation of video information, which can be performed by the system of the present invention.

5 Claims, 7 Drawing Sheets

SYSTEM AND METHOD FOR AUTOMATICALLY DETECTING A VARIATION OF VIDEO INFORMATION

BACKGROUND OF THE INVENTION

1. Field of the Invention

The present invention relates in general to a system and a method for automatically detecting a variation of video information, and more particularly to a system and a method for automatically detecting a variation of video information, which are capable of decoding a scanned video signal from a monitoring camera, storing the decoded video signal, detecting the variation of video information on the basis of the stored video signal, displaying a portion of the video signal on a screen corresponding to the detected variation of video information, and giving an alarm in accordance with the detected variation of video information.

2. Description of the Prior Art

With reference to FIG. 1, there is shown a schematic diagram of a basic construction of a conventional monitoring system. As shown in this drawing, the conventional monitoring system comprises a monitoring camera 1 for obtaining video information with regard to a place to be monitored, and a monitor 3 for receiving the video information from the monitoring camera 1 through a cable 2 and displaying the received video information on the screen.

In the conventional monitoring system, monitoring camera 1 is installed in a place to be monitored and is connected to the monitor 3 via the cable 2. As a result, a watchman watches the monitor 3 to grasp a situation in the place to be monitored.

In the conventional monitoring system with the above-mentioned construction, however, the watchman must watch continuously the monitor 3, with great conscientiousness, to monitor the situation in the place to be monitored, without missing a moment, from beginning to end. In particular, it is extremely difficult for the watchman to watch continuously only the monitor in a difficult case such as a night-watch. In this case, the watchman sometimes cannot watch the monitor continuously and leaves his or her seat unoccupied, for a short time, in order to handle a different job. At this time, if a trespasser intrudes into the place to be monitored, or a sudden happening breaks out in that place and thereafter the situation in that place is returned to the original one, or is suspended, the watchman cannot detect the presence of the trespasser or the breaking-out of the sudden happening upon resuming his or her watching of the monitor 3. As a result, the watchman cannot perform his or her monitoring duty perfectly.

SUMMARY OF THE INVENTION

Therefore, it is an object of the present invention to provide a system and a method for automatically detecting a variation of video information, which are capable of detecting the variation of video information in accordance with the presence of a trespasser or the breaking-out of a sudden happening in a place to be monitored although the watchman does not watch continuously a monitor from beginning to end, displaying a portion of the video information on a screen corresponding to the detected variation of video information and giving an alarm in accordance with the detected variation of video information, so that the watchman may confirm the monitor only when the alarm is given in accordance with the detected variation of video information, so as to grasp a situation in the place to be monitored.

In accordance with one aspect of the present invention, there is a system for automatically detecting a variation of video information in a video signal comprising: a monitoring camera for picking up an image in a place to be monitored and outputting a video signal; video information variation detecting means for converting the video signal outputted from the monitoring camera into digital video data, storing the digital video data by one frame and comparing the current inputted video data with the stored video data to detect a portion wherein said current and stored video data are different from each other as the variation of video information; system control means including a key input unit for inputting a plurality of key signals for a monitoring operation and a microcomputer for scanning the key signals from the key input unit and controlling the system operation in accordance with the scanned result; video output control means for setting a window area on a monitor and, if the video information variation detecting means detects the variation of video information in the set window area, outputting an alarm control signal and generating a variation indicating marker signal corresponding to the variation detected portion in the set window area, such that the marker signal is overlap-displayed on the current picture on the monitor corresponding to the portion in the window area where the variation was detected; alarm output means for giving an alarm in accordance with the alarm control signal from the video output control means; and said monitor displaying the video signal wherein any variation has been detected, under control of the video output control means.

In accordance with another aspect of the present invention, there is provided a method of automatically detecting a variation of video information in a video signal comprising the steps of: (a) storing video information from a video signal from a monitoring camera, which picks up an image of an object, as reference information; (b) comparing the video information from the monitoring camera with the stored reference information and detecting the variation of video information in accordance with the compared result; (c) setting a monitoring area under control of a user of the method utilizing data input means; and (d) giving an alarm when the variation of video information is detected in the set monitoring area.

BRIEF DESCRIPTION OF THE DRAWINGS

The above and other objects, features and advantages of the present invention will be more clearly understood from the following detailed description taken in conjunction with the accompanying drawings, in which.

DETAILED DESCRIPTION OF PREFERRED EMBODIMENTS

First, a construction of a system for automatically detecting a variation of video information in accordance with the present invention will be described with reference to FIGS. 2 through 4.

Figure 1:
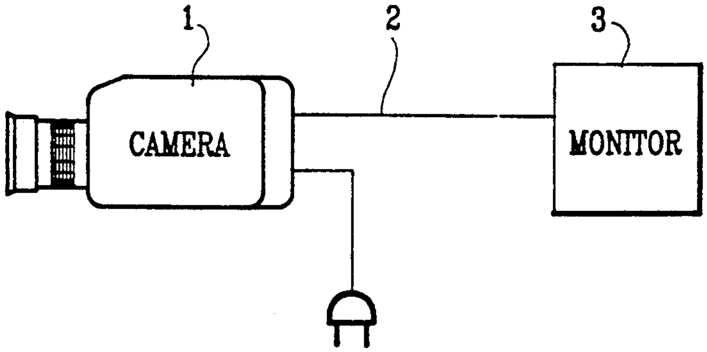
FIG. 1 PRIOR ART
FIG. 1 is a schematic diagram of a basic construction of a conventional monitoring system.
Figure 2:
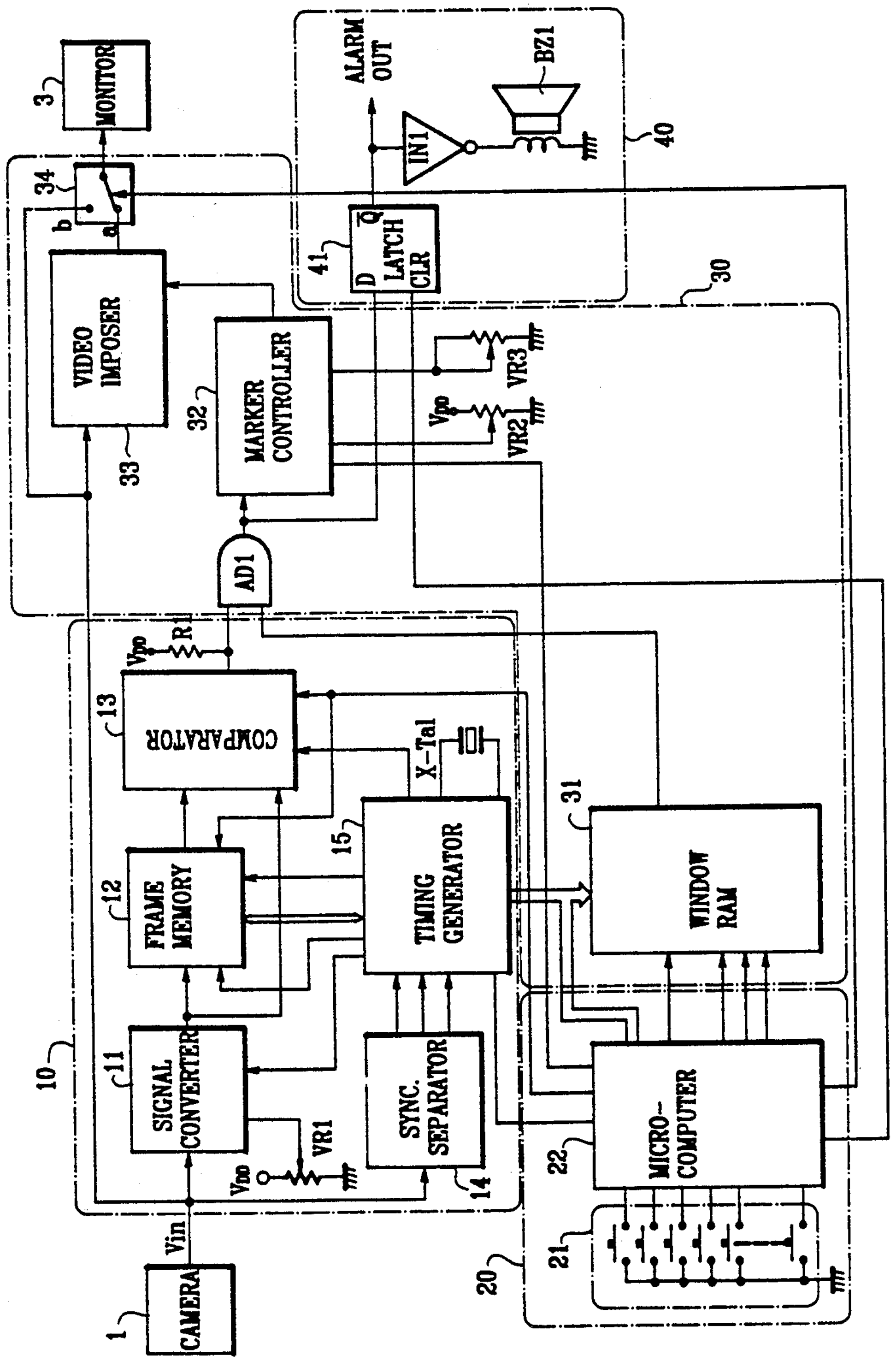
FIG. 2 is a block diagram of a system for automatically detecting a variation of video information in accordance with the present invention.

With reference to FIG. 2, there is shown a block diagram of a system for automatically detecting a variation of video information in accordance with the present invention. As shown in this drawing, the system of the present invention comprises a monitoring camera 1 for picking up an image in a place to be monitored, and a video information variation detecting circuit 10 for converting a video signal outputted from the monitoring camera 1 into digital data, storing the digital data, or video data by one frame and comparing the current inputted video data with the stored video data to detect a portion different from each other as a variation of video information. The system also comprises a system control circuit 20 including a key input unit 21 for inputting a plurality of key signals for a monitoring operation and a microcomputer 22 for scanning the key signals from the key input unit 21 and controlling the system operation in accordance with the scanned result. The system also comprises a video output control circuit 30 for setting a window area on the screen and, if the video information variation detecting circuit 10 detects the variation of video information in the set window area, outputting an alarm control signal and generating a variation indicating marker signal corresponding to the variation detected portion in the window area, such that the marker signal is overlap-displayed on the current picture on the screen corresponding to the variation detected portion in the window area. The system also comprises an alarm output circuit 40 for giving an alarm in accordance with the alarm control signal from the video output control circuit 30, and a monitor 3 for displaying a variation detected video signal on the screen under a control of the video output control circuit 30.

The video information variation detecting circuit 10 includes a signal converter 11 for converting the video signal from the monitoring camera 1 into digital data, a frame memory 12 for storing the digital data, or video data from the signal converter 11 by one frame, a comparator 13 for comparing the video data from the signal converter 11 with the video data from the frame memory 12, a synchronous separator 14 for separating vertical and horizontal synchronous signals Vsync/Hsync from the video signal form the monitoring camera 1, and a timing generator 15 for generating a timing clock signal and an address based on the vertical and horizontal synchronous signals Vsync and Hsync from the synchronous separator 14 or self-vertical and horizontal synchronous signals Vsync and Hsync, so as to supply the timing clock signal to the signal converter 11, the frame memory 12 and the comparator 13 and supply the address to the frame memory 12.

Figure 3:
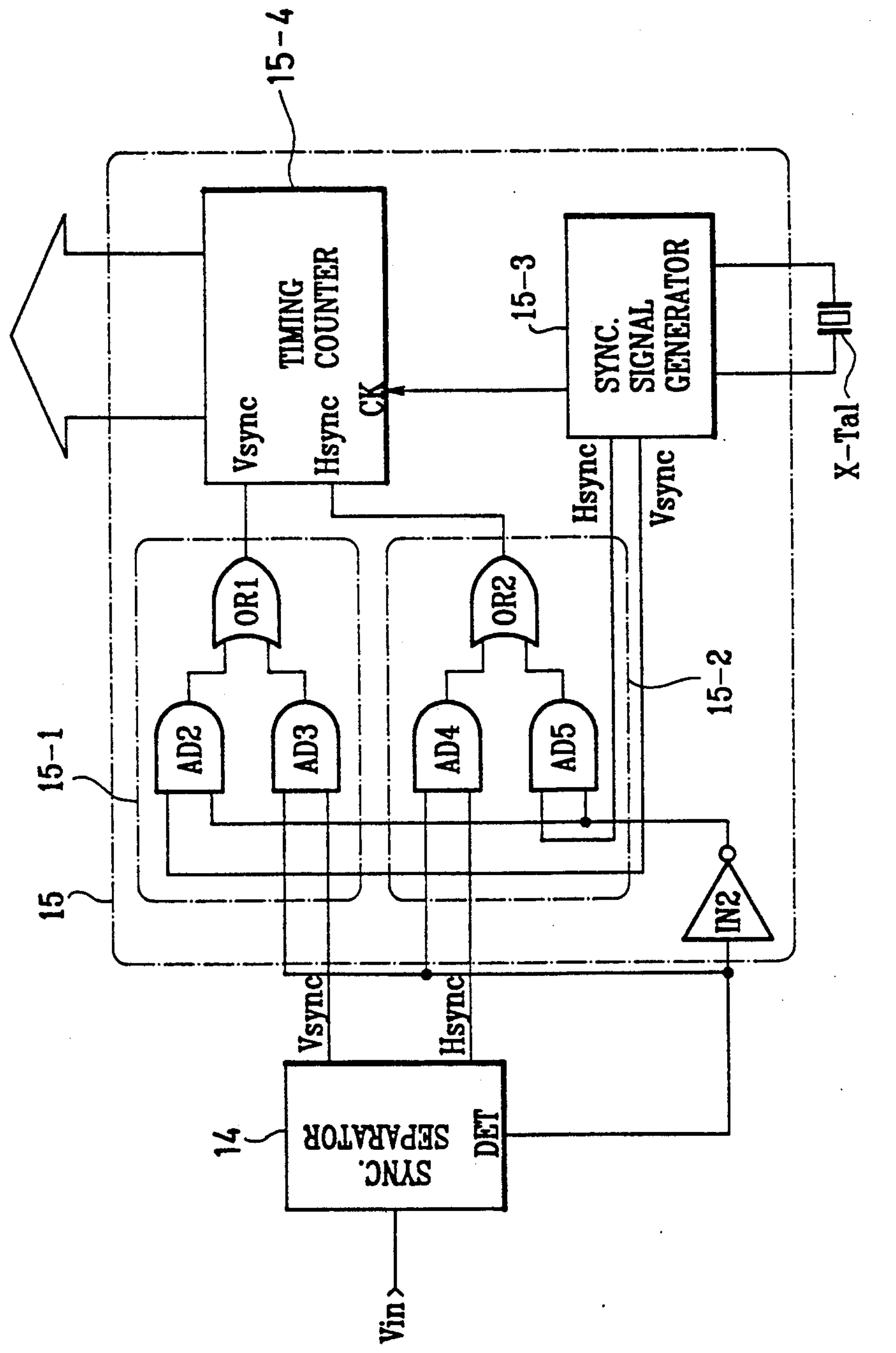
FIG. 3 is a detailed circuit diagram of a timing generator in FIG. 2.

With reference to FIG. 3, there is shown a detailed circuit diagram of the timing generator 15 in the video information variation detecting circuit 10 in FIG. 2. As shown in the drawing, the timing generator 15 includes a synchronous signal generator 15-3 for dividing an oscillating frequency of a crystal oscillator X-tal to generate the horizontal synchronous signal Hsync and the vertical synchronous signal Vsync itself, a vertical synchronous signal selector 15-1 for selecting the vertical synchronous signal Vsync from the synchronous separator 14 or the vertical synchronous signal Vsync from the synchronous signal generator 15-3 in accordance with a synchronous signal presence/absence detect signal DET from the synchronous separator 14, a horizontal synchronous signal selector 15-2 for selecting the horizontal synchronous signal Hsync from the synchronous separator 14 or the horizontal synchronous signal Hsync from the synchronous signal generator 15-3 in accordance with the synchronous signal presence/absence detect signal DET from the synchronous separator 14, and a timing counter 15-4 for counting a clock signal CK from the synchronous signal generator 15-3 synchronously with the horizontal synchronous signal Hsync from the horizontal synchronous signal selector 15-2 and the vertical synchronous signal Vsync from the vertical synchronous signal selector 15-1, so as to generate the address to the frame memory 12 and the timing clock signal to the signal converter 11, the frame memory 12 and the comparator 13.

Referring again to FIG. 2, the video output control circuit 30 includes a window RAM 31 for storing a screen window address in accordance with window setting data from the microcomputer 22 in the system control circuit 20, an AND gate AD1 for combining the window address data from the window RAM 31 with output data from the comparator 13 in the video information variation detecting circuit 10 to output the alarm control signal, a marker controller 32 for outputting the variation indicating marker signal corresponding to the variation detected portion on the screen in response to an output signal from the AND gate AD1 and under a control of the microcomputer 22, a video imposer 33 for imposing the variation indicating marker signal from the marker controller 32 on the video signal from the monitoring camera 1, and a switch 34 for selecting the video signal from the monitoring camera 1 or an output signal from the video imposer 33 and outputting the selected signal to the monitor 3 under an automatic monitoring function control of the microcomputer 22.

Figure 4:
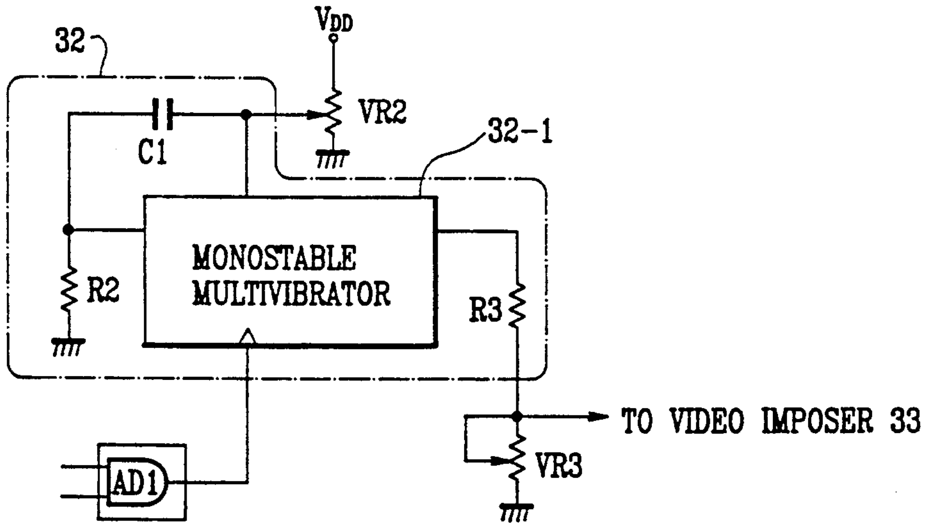
FIG. 4 is a detailed circuit diagram of a marker controller in FIG. 2.

With reference to FIG. 4, there is shown a detailed circuit diagram of the marker controller 32 in the video output control circuit 30 in FIG. 2. As shown in this drawing, the marker controller 32 includes a monostable multivibrator 32-1 for inputting the output signal from the AND gate AD1 as a trigger signal and being triggered for a constant time in response to the trigger signal, a resistor R2, a condenser C1 and a variable resistor VR2 for setting a time constant of the monostable multivibrator 32-1, and a resistor R3 and a variable resistor VR3 for regulating an output signal from the monostable multivibrator 32-1 by a predetermined level and outputting the regulated signal as the variation indicating maker signal to the video imposer 33.

On the other hand, referring again to FIG. 2, the alarm output circuit 40 includes a latch 41 for latching the output signal from the AND gate AD1 in the video output control circuit 30 to output an alarm signal ALARMout at its inverting output terminal and being cleared under a control of the microcomputer 22 in the system control circuit 20, an inverter gate IN1 for inverting the output signal at the inverting output terminal of the latch 41, and a buzzer BZ1 for being driven in response to an output signal from the inverter gate IN1 to give an alarm.

Now, the operation of the system with the above-mentioned construction in accordance with the present invention will be described in detail with reference to FIGS. 5 through 7.

Figure 5:
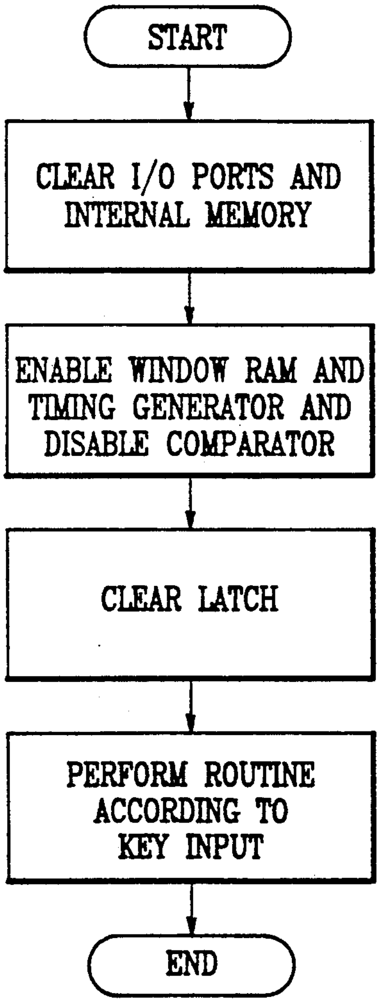
FIG. 5 is a flowchart illustrating an initializing operation of the system in FIG. 2 in accordance with the present invention.

First, the user resets the microcomputer 22 in the system control circuit 20 at the initial state wherein the power is supplied to the system, such that the microcomputer 22 performs an initializing operation of the system as shown in a flowchart of FIG. 5. That is, upon reset, the microcomputer 22 clears its using ports, and clears its internal RAM and registers or sets them to an initial value. Then, the microcomputer 22 scans the key input unit 21 to check whether a key signal has been inputted, and, if inputted, performs a system control operation in accordance with the inputted key signal.

If a marker on key signal is inputted through the key input unit 21 by the user after the initializing operation of the system is performed by the microcomputer 22 in the above-mentioned manner, the microcomputer 22 enables the timing generator 15 in the video information variation detecting circuit 10, the marker controller 32 and the window RAM 31 in the video output control circuit 30 and outputs the window data set by the user to the window RAM 31. Also, the microcomputer 22 controls the switch 34 such that the switch 34 selects the output signal from the video imposer 33.

At this time, if no video signal from the monitoring camera 1 is inputted, the synchronous signal generator 15-3 in the timing generator 15 divides the oscillating frequency of the crystal oscillator X-tal to generate the horizontal synchronous signal Hsync and the vertical synchronous signal Vsync itself and outputs the self-vertical and horizontal synchronous signals Vsync and Hsync to the timing counter 15-4. Upon receiving the vertical and horizontal synchronous signals Vsync and Hsync from the synchronous signal generator 15-3, the timing counter 15-4 supplies addresses to the frame memory 12 in the video information variation detecting circuit 10 and to the window RAM 31 in the video output control circuit 30 and other control signals synchronously with the received vertical and horizontal synchronous signals Vsync and Hsync.

At the same time, supposing that an Automatic monitor key on the key input unit 21 has not been pushed by the user, the frame memory 12 and the comparator 13 in the video information variation detecting circuit 10 are disabled by the microcomputer 22 in the system control circuit 20, so that a source voltage $V_{DD}$ of high level is applied to one input terminal of the AND gate AD1 in the video output control circuit 30 through a pull-up resistor R1 at the output stage of the comparator 13.

Figures 6A, 6B, 6C, 6D:
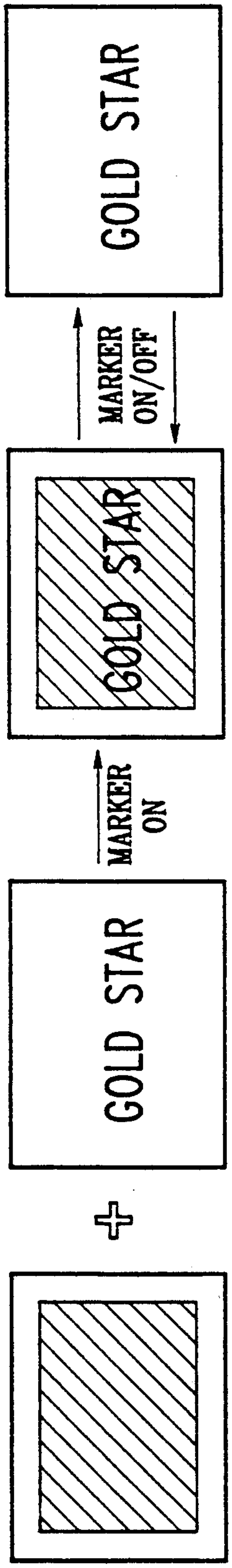
FIGS. 6A through 6D illustrate, in sequence, a combining process of video data with window data in accordance with an embodiment of the present invention.

As a result, the window address data preset in the window RAM 31 in the video output control circuit 30 is applied directly to the marker controller 32 and then to the video imposer 33 through the marker controller 32. In result, the window set by the microcomputer 22 appears on a given background color as shown in FIG. 6A. Herein, the window area is set as an area in which the variation of video information is to be detected by the user.

If video signal Vin from the monitoring camera 1 is applied under the above-mentioned condition, the window set by the microcomputer 22 is imposed as shown in FIG. 6C on the picture on the screen which is displayed as the video signal Vin, such as, for example, "GOLD STAR", as shown in FIG. 6B.

Thereafter, if the user pushes a Marker off key on the key input unit 21, the microcomputer 22 scans the Marker off key and thus disables the marker controller 32. As a result, the marker by the window does not appear on the screen and only original video signal is displayed on the screen, as shown in FIG. 6D. If the automatic monitoring function is performed at this time, i.e., if the Automatic monitor key on the key input unit 21 is pushed by the user at this time, a variation of video information, i.e., a movement of image being picked up, is automatically detected. If variation of video information is automatically detected, marker confirmable by the user is displayed on a portion on the screen corresponding to the variation of video information.

To explain it in more detail, if the Automatic monitor key on the key input unit 21 is pushed by the user, the microcomputer 22 scans the Automatic monitor key and thus enables the signal converter 11, the frame memory 12 and the comparator 13 in the video information variation detecting circuit 10 and the alarm output circuit 40, in addition to the control to the marker on state. As a result, the frame memory 12 is writable. Also, the signal converter 11 outputs video data of logic "1" when the level of the video signal Vin from the monitoring camera 1 is higher than that set by a variable resistor VR1; video data of logic "0" when the level of the video signal Vin from the monitoring camera 1 is lower than that set by the variable resistor VR1. These video data from the signal converter 11 are stored in the frame memory 12 by one frame.

Then, the microcomputer 22 outputs a read signal RD to the frame memory 12 to transfer the video data stored in the frame memory 12 to the comparator 13. Hereinafter inputted, new video data is not stored in the frame memory 12 and is applied directly to the comparator 13. Apply of the hereinafter inputted, new video data to the comparator 13 is controlled by a timing identical to the read timing of the frame memory 12, such that the new video data is compared, accurately every pixel, with the video data from the frame memory 12 as reference data in the comparator 13.

Upon receiving the video signal Vin from the monitoring camera 1, the synchronous separator 14 in the video information variation detecting circuit 10 outputs the synchronous signal presence/absence detect signal DET of high level and separates the vertical and horizontal synchronous signals Vsync/Hsync from the video signal Vin from the monitoring camera 1. If the synchronous signal presence/absence detect signal DET is high, i.e., if the video signal Vin from the monitoring camera 1 is inputted, low level signals are outputted respectively from an AND gate AD2 in the vertical synchronous signal selector 15-1 and an AND gate AD5 in the horizontal synchronous signal selector 15-2 which are included in the timing generator 15 in the video information variation detecting circuit 10. Also, the vertical and horizontal synchronous signals Vsync/-Hsync from the synchronous separator 14 are applied to the timing counter 15-4 respectively through AND gates AD3 and AD4 and then through OR gates OR1 and OR2 which are included respectively in the vertical synchronous signal selector 15-1 and the horizontal synchronous signal selector 15-2. As a result, the timing generator 15 generates the timing clock signal and address synchronously with the vertical and horizontal synchronous signals Vsync and Hsync of the video signal Vin from the monitoring camera 1. On the other hand, if the synchronous signal presence/absence detect signal DET is low, i.e., if no video signal Vin from the monitoring camera 1 is inputted, low level signals are outputted respectively from the AND gate AD3 in the vertical synchronous signal selector 15-1 and the AND gate AD4 in the horizontal synchronous signal selector 15-2. Also, the self-vertical and horizontal synchronous signals Vsync/Hsync from the synchronous signal generator 15-3 are applied to the timing counter 15-4 respectively through the AND gates AD2 and AD5 and then through the OR gates OR1 and OR2 which are included respectively in the vertical synchronous signal selector 15-1 and the horizontal synchronous signal selector 15-2. As a result, the timing generator 15 generates the timing clock signal and address synchronously with the self-vertical and horizontal synchronous signals Vsync and Hsync from the synchronous signal generator 15-3.

The comparator 13 compares the newly inputted video data from the signal converter 11 with the video data read from the frame memory 12. If the newly inputted video data from the signal converter 11 is different from the video data read from the frame memory 12, the comparator 13 in the video information variation detecting circuit 10 outputs a signal of high level to one input terminal of the AND gate AD1 in the video output control circuit 30.

On the other hand, the preset window data stored in the window RAM 31 in the video output control circuit 30 is outputted from the window RAM 31 every address outputted from the timing generator 15 in the video information variation detecting circuit 10. The window data from the window RAM 31 is applied to the other input terminal of the AND gate AD1.

If the video data read from the window RAM 31 is high and the output signal from the comparator 13 is high, i.e., if a variation of video information occurs in the window setting area, they are applied to the marker controller 32 in the video output control circuit 30 and the alarm output circuit 40. In the marker controller 32, the size of the marker signal to be outputted therefrom is adjusted by the variable resistor VR2 and the amplitude thereof is adjusted by the variable resistor VR3. Then, the marker signal from the marker controller 32 is applied to the video imposer 33 in the video output control circuit 30. Upon apply of the marker signal from the marker controller 32, the video imposer 33 imposes the variation indicating marker signal from the marker controller 32 on the video signal Vin from the monitoring camera 1 and outputs the marker signal imposed video signal to one fixed terminal of the switch 34 in the video output control circuit 30. The switch 34 selects the marker signal imposed video signal from the video imposer 33 under the control of the microcomputer 22 and outputs the selected marker signal imposed video signal to the monitor 3 such that the marker signal imposed video signal are displayed on the screen of the monitor 3.

The operation of the system of the present invention in a case where the user pushes an Edit key on the key input unit 21 to set the window will now be described.

Figures 7A, 7B, 7C, 7D, 7E, 7F:
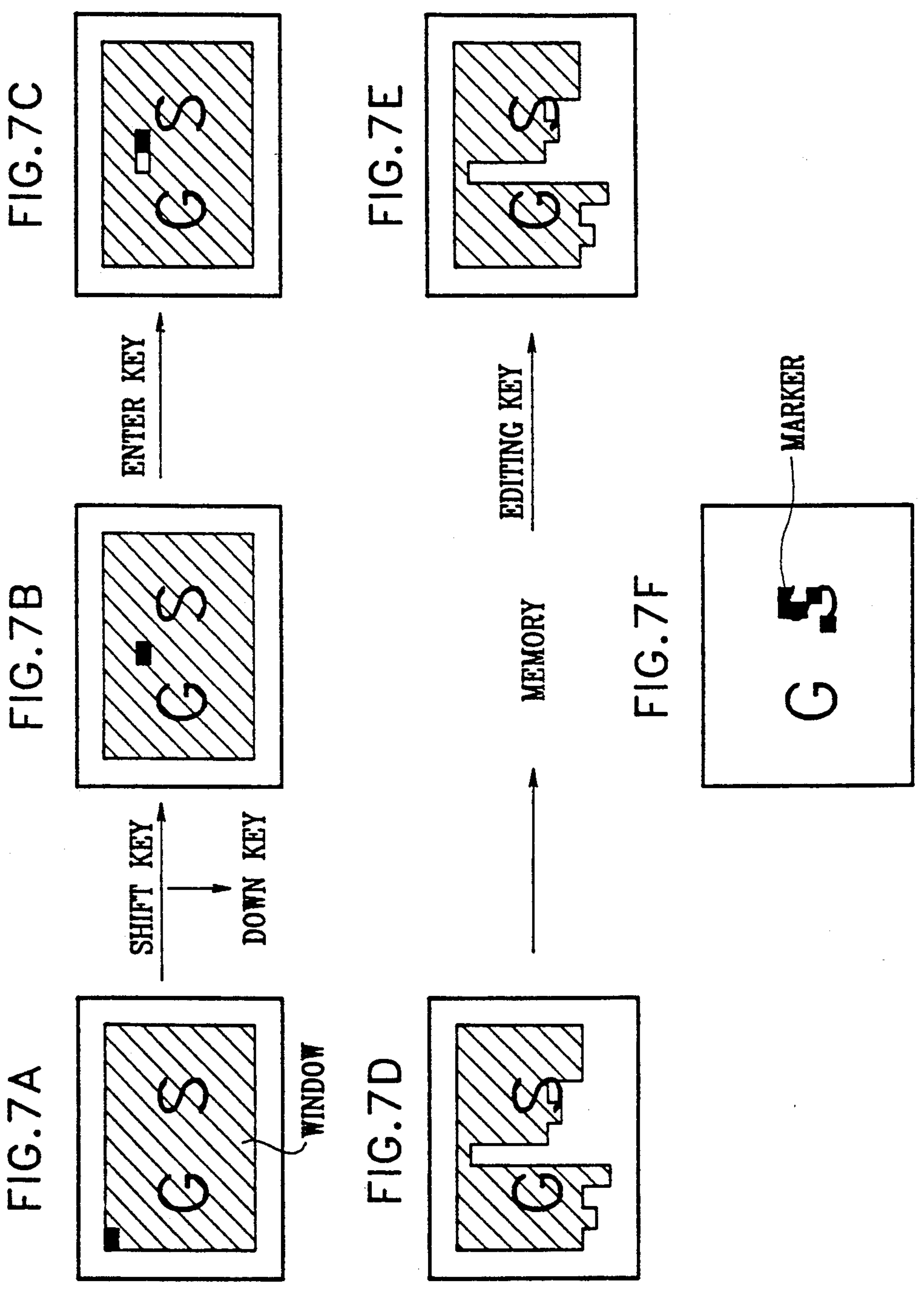
FIGS. 7A through 7F illustrate, in sequence, a window screen editing process in accordance with the embodiment of the present invention.

First, on the screen is positioned a cursor (■ portion) as shown in FIG. 7A. Then, if the user moves the cursor as shown in FIG. 7B utilizing Up, Down, Right and Left keys and then pushes an Enter key, the cursor is turned off. If the user pushes the Enter key once more under the condition that the cursor is turned off, the cursor is turned on. In FIG. 7C, □ indicates a portion on the screen in which no window is present and ■ portion shows that the cursor is moved by one step in a horizontal direction.

Under the above condition, the cursor flickers in a position that the user moves the cursor utilizing the Up, Down, Right and Left keys. At this time, if the user pushes the Enter key once, the window is turned off in the position in which the cursor flickers and only the cursor flickers in the position. Namely, the position in which only the cursor flickers is set to a low level, or logic 0. This means that the position in which only the cursor flickers is not selected as a monitoring area by the user. If the user does not turn off the window in the position in which the cursor flickers, the position is selected as the monitoring area and thus logic 1 data is stored in the window RAM 31 in the video output control circuit 30.

Next, the alarm output operation of the system of the present invention will be mentioned.

If the video data read from the window RAM 31 in the video output control circuit 30 is high and the output signal from the comparator 13 in the video information variation detecting circuit 10 is high, i.e., if a variation of video information occurs in the window setting area, the AND gate AD1 in the video output control circuit 30 outputs a high level signal. As a result, the marker controller 32 in the video output control circuit 30 outputs a marker on the screen corresponding to the variation of video information and the alarm output circuit 40 gives the alarm through the buzzer BZ1. Namely, Upon receiving the high level signal from the AND gate AD1, the latch 41 in the alarm output circuit 40 latches the high level signal from the AND gate AD1 and outputs a low level signal at its inverting output terminal. The low level signal from the latch 41 is inverted into a high level signal by the inverter gate IN1 and the high-inverted signal from the inverter gate IN1 is applied to the buzzer BZ. In result, the alarm is given by the buzzer BZ1.

At this time, the user perceives the variation of video information with the assistance of the alarm and then watches the marker on the screen of the monitor 3 to readily confirm a situation in the place to be monitored, corresponding to the variation of video information. Thereafter, if an Alarm off key on the key input unit 21 is pushed by the user, the microcomputer 22 perceives the Alarm off key has been pushed and clears the latch 41 in the alarm output circuit 40 to stop the alarm.

On the other hand, if the user pushes the Marker off key on the key input unit 21, the window disappears on the screen. Then, if a variation of video information is present, i.e., a sudden happening breaks out under the condition that the Automatic monitor key on the key input unit 21 is pushed by the user, the marker appears on a portion on the screen corresponding to the variation of video information, with the alarm being given as mentioned above. Thereafter, if the Alarm off key on the key input unit 21 is pushed by the user, the alarm is turned off. Also, the marker disappears. However, when the Automatic monitor key on the key input unit 21 is not pushed by the user, the variation of video information cannot be detected. Also, if the character "S" disappears under the condition that the window is set, the marker flickers only in the portion on the screen corresponding to the character "S", as shown in FIG. 7F, since there is no different portion but the character "S" in the current situation. Namely, the disappearing of the character "S" indicates the variation of video information.

Referring again to FIG. 3, if the video signal Vin from the monitoring camera 1 is present, the synchronous signal presence/absence detect signal DET from the synchronous separator 14 is active-high. As a result, the vertical and horizontal synchronous signals Vsync/-Hsync from the synchronous separator 14 are applied to the timing counter 15-4 in the timing generator 15 respectively through the AND gate AD3 and AD4 and then through the OR gates OR1 and OR2 which are included respectively in the vertical synchronous signal selector 15-1 and the horizontal synchronous signal selector 15-2 in the timing generator 15. For this reason, the timing generator 15 generates the timing clock signal and address synchronously with the vertical and horizontal synchronous signals Vsync and Hsync of the video signal Vin from the monitoring camera 1. On the other hand, if no video signal Vin from the monitoring camera 1 is present, the synchronous signal presence/absence detect signal DET from the synchronous separator 14 is low. As a result, the self-vertical and horizontal synchronous signals Vsync/Hsync from the synchronous signal generator 15-3 are applied to the timing counter 15-4 respectively through the AND gates AD2 and AD5 and then through the OR gates OR1 and OR2 which are included respectively in the vertical synchronous signal selector 15-1 and the horizontal synchronous signal selector 15-2. As a result, the timing generator 15 generates the timing clock signal and address synchronously with the self-vertical and horizontal synchronous signals Vsync and Hsync from the synchronous signal generator 15-3.

Also, referring again to FIG. 4, a pulse width of a signal to be outputted from the monostable multivibrator 32-1 in the marker controller 32 is adjusted by the combination of the variable resistor VR2, the resistor R2 and the condenser C1. Then, the monostable multivibrator 32-1 is triggered by the output signal from the AND gate AD1 in the video output control circuit 30 for a constant time and then outputs the output signal of the pulse width set by the combination of the variable resistor VR2, the resistor R2 and the condenser C1. The amplitude of the pulse width adjusted output signal from the monostable multivibrator 32-1 is then adjusted by the variable resistor VR3 by a predetermined level. As a result, the amplitude adjusted signal by the variable resistor VR3 is applied to the video imposer 33.

As mentioned above, the method of automatically detecting the variation of video information in accordance with the present invention is performed by a video information storing step, a video information variation detecting step, a monitoring area setting step and an alarm giving step.

The video information storing step is to store video information from the monitoring camera 1, which picks up an image of an object, as reference information in the frame memory 12.

The video information variation detecting step is to compare the current video information from the monitoring camera 1 with the reference information stored in the frame memory 12 and detect the variation of video information in accordance with the compared result.

Also, the monitoring area setting step is to set the monitoring area required by the user as the window utilizing the key input unit 21.

On the other hand, the alarm giving step is to give the alarm when the variation of video information is detected in the window area.

As hereinbefore described, in accordance with the present invention, there are provided the system and the method for automatically detecting the variation of video information, which are capable of detecting the variation of video information in accordance with the presence of a trespasser or the breaking-out of a sudden happening in a place to be monitored although the user, or the watchman does not watch contiuously the monitor from beginning to end, displaying a portion on the screen corresponding to the detected variation of video information and giving an alarm in accordance with the detected variation of video information. Therefore, since the user may confirm the monitor only when the alarm is given in accordance with the detected variation of video information, it is convenient for the user to perform his or her monitoring duty even in a tougher case such as a night-watch.

Although the preferred embodiments of the present invention have been disclosed for illustrative puspose, those skilled in the art will appreciate that various modifications, additions and substitutions are possible, without departing from the scope and spirit of the invention as disclosed in the accompanying claims.

What is claimed is:

1. A system for automatically detecting a variation of video information in a video signal, comprising:

a monitoring camera for picking up an image in a place to be monitored and outputting a video signal;

video information variation detecting means for converting the video signal outputted from said monitoring camera into digital video data, storing the digital video data by one frame and comparing the current inputted video data with the stored video data to detect a portion wherein said current and stored video data are different from each other, as the variation of video information;

system control means including a key input unit for inputting a plurality of key signals for a monitoring operation and a microcomputer for scanning the key signals from said key input unit and controlling the system operation in accordance with the scanned result;

video output control means for setting a window area on a monitor and, if said video information variation detecting means detects the variation of video information on the set window area, outputting an alarm control signal and generating a variation indicating marker signal corresponding to the portion in the set window area where the variation was detected, such that the marker signal is overlap-displayed on the current picture on the monitor corresponding to the variation-detected portion in the window area;

alarm output means for giving an alarm in accordance with the alarm control signal from said video output control means; and the monitor displaying a variation-detected video signal under control of said video output control means;

wherein said video output control means includes:

a window RAM for storing a screen window address in accordance with window setting data from said microcomputer in said system control means;

an AND gate for combining the window address data from said window RAM with output data from said video information variation detecting means to output the alarm control signal;

a marker controller for outputting the variation indicating marker signal corresponding to the variation detected portion on the screen in response to an output signal from said AND gate and under control of said microcomputer in said system control means;

a video imposer for imposing the variation indicating marker signal from said marker controller on the video signal from said monitoring camera; and a switch for selecting the video signal from said monitoring camera or an output signal from said video imposer and outputting the selected signal to said monitor under automatic monitoring function control of said microcomputer in said system control means.

2. A system for automatically detecting a variation of video information, as set forth in claim 1, wherein said alarm output means includes:

a latch for latching the alarm control signal from said video output control means to output an alarm signal at its inverting output terminal and being cleared under a control of said microcomputer in said system control means;

an inverter gate for inverting the alarm signal at the inverting output terminal of said latch; and a buzzer for being driven in response to an output signal from said inverter gate to give the alarm.

3. A system for automatically detecting a variation of video information, as set forth in claim 1, wherein said video information variation detecting means includes:

a signal converter for converting the video signal from said monitoring camera into digital data;

a frame memory for storing the digital data, or video data from said signal converter by one frame;

a comparator for comparing the video data from said signal converter with the video data from said frame memory;

a synchronous separator for separating vertical and horizontal synchronous signals from the video signal from said monitoring camera; and a timing generator for generating a timing clock signal and an address based on the vertical and horizontal synchronous signals from said synchronous separator or self-vertical and horizontal synchronous signals, so as to supply the timing clock signal to said signal converter, frame memory and comparator and supply the address to said frame memory.

4. A system for automatically detecting a variation of video information, as set forth in claim 3, wherein said timing generator includes:

a synchronous signal generator for dividing an oscillating frequency of a crystal oscillator to generate the self-horizontal synchronous signal and the self-vertical synchronous signal;

a vertical synchronous signal selector for selecting the vertical synchronous signal from said synchronous separator or the self-vertical synchronous signal from said synchronous signal generator in accordance with a synchronous signal presence/absence detect signal from said synchronous separator;

a horizontal synchronous signal selector for selecting the horizontal synchronous signal from said synchronous separator or the self-horizontal synchronous signal from said synchronous signal generator in accordance with the synchronous signal presence/absence detect signal from said synchronous separator; and a timing counter for counting a clock signal from said synchronous signal generator synchronously with the horizontal synchronous signal from said horizontal synchronous signal selector and the vertical synchronous signal from said vertical synchronous signal selector, so as to generate the address to said frame memory and the timing clock signal to said signal converter, frame memory and comparator.

5. A system for automatically detecting a variation of video information, as set forth in claim 1, wherein said marker controller includes;

a monostable multivibrator for inputting the output signal from said AND gate as a trigger signal and being triggered for a constant time in response to the trigger signal;

a first resistor, a condenser and a first variable resistor for setting a time constant of said monostable multivibrator; and a second resistor and a second variable resistor for regulating an output signal from said monostable multivibrator by a predetermined level and outputting the regulated signal as the variation indicating marker signal to said video imposer.

* * * * *